United States Patent Office 2,984,545
Patented May 16, 1961

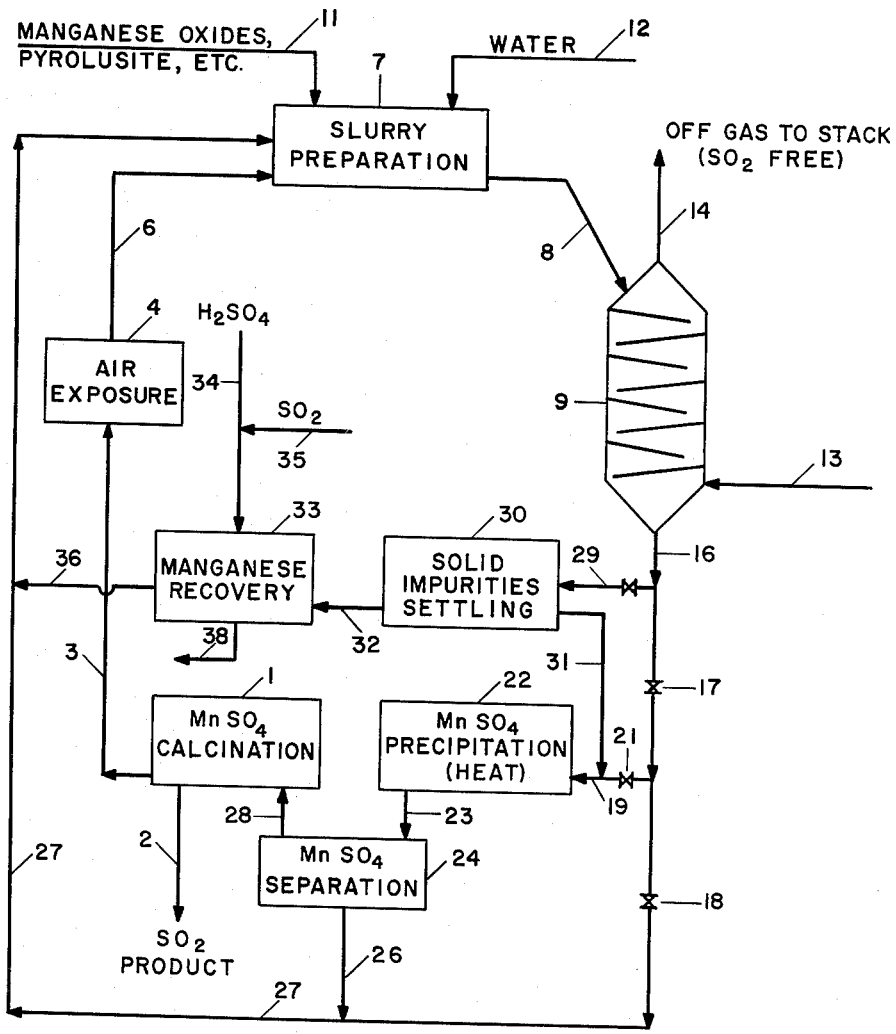

2,984,545

MANGANESE OXIDE PROCESS FOR THE RECOVERY OF SULFUR DIOXIDE FROM WASTE GASES

Grady Tarbutton, Thomas M. Jones, and John C. Driskell, Sheffield, and Carter M. Smith, Florence, Ala., assignors to Tennessee Valley Authority, a corporation of the United States Filed Feb. 27, 1958, Ser. No. 718,098

4 Claims. (Cl. 23—178)

(Granted under Title 35, U.S. Code (1952), sec. 266)

The invention herein described may be manufactured and used by or for the Government for governmental purposes without the payment to us of any royalty therefor.

This invention is an improved process for the recovery of sulfur dioxide from waste gases. Sulfur dioxide is a constituent of many waste gases such as smelter gases, offgases from many chemical processes, and stack gases from coal-burning furnaces. Many methods have been proposed for removing sulfur dioxide from waste gases when its concentration in such gases is well above 1 percent, but the known methods have been impractical when applied to gases containing less than 1 percent.

The total quantity of sulfur dioxide contained in waste gases may be very large, although its concentration in such gases is below 1 percent. For example, a modern electric power plant of 1,350,000 kw. capacity will burn 15,000 tons of coal per day. Much coal contains about 3.5 percent sulfur, or even more. The emission of sulfur dioxide from a plant of this size using such coal would amount to about 1,000 tons per day, although the concentration of sulfur dioxide in the stack gases would be very low—about 0.3 percent.

Processes for recovering sulfur dioxide from gases have been described in U.S. Patents 2,188,324; 2,304,178; 2,332,647; 2,342,704; and others. These processes are based upon catalytic oxidation of sulfur dioxide to sulfur trioxide, formation of sulfuric acid by reaction between sulfur trioxide and water, and optionally further reaction of sulfuric acid to form sulfates. Although waste gases containing 1 to 3.5 percent $SO_2$ often are treated to remove the sulfur dioxide by methods such as those shown in the patents mentioned above, those gases containing less than 1 percent, apparently without exception, are discarded.

In a number of installations in England, sulfur dioxide is scrubbed from stack gases from furnaces burning high sulfur coal with a suspension of chalk, merely to abate the nuisance. The resulting calcium compounds are discarded. No practical method for the recovery of sulfur dioxide in usable form from coal gases has been used commercially.

The reason for this lies in the fact that prior processes have required such large and expensive equipment and have involved the pumping of such enormous quantities of liquids and gases against considerable pressure that they are impractical when applied to waste gases containing as little as 1 percent sulfur dioxide.

The recovery of sulfur dioxide from waste gases by reaction with manganese dioxide and pyrolusite also has been suggested. However, incomplete recovery has characterized the use of such reagents and has resulted in products which are mixtures of manganese sulfate and sulfuric acid. These products have required expensive and complicated methods for separation into commercially acceptable materials.

Thus, an unsolved problem has been to find some economically feasible process for recovering substantially all sulfur dioxide in useful form from waste gases containing 1 percent or less of sulfur dioxide.

It is an object of this invention to provide a process for the recovery of sulfur dioxide from waste gases containing sulfur dioxide wherein recovery of the sulfur dioxide is substantially complete.

Another object is to provide such process wherein copper, or phenolic substances generated by combustion of coal do not interfere.

Another object is to provide such process which is capable of producing sulfur dioxide in high concentration from gases evolved in burning sulfur-bearing coal and which may be conducted continuously for long periods of time.

Still another object is to provide such process which is capable of producing a stream of concentrated sulfur dioxide at costs which are, in many locations, comparable to those of producing an equivalent stream of sulfur dioxide by burning native sulfur.

Yet another object is to provide such process which is simple and dependable and in which equipment costs are relatively low.

Still another object is to provide such process wherein dust or entrained solids in waste gases do not interfere.

Other objects and advantages of our invention will become apparent as this disclosure proceeds.

We have found that these objects are attained in a process which comprises heating manganese sulfate to a temperature in the range from about 900° C. to 1100° C. in a calcining zone until rapid evolution of sulfur dioxide ceases; withdrawing a stream of sulfur dioxide from the calcining zone; cooling a mixture of manganese oxides, formed in the calcining zone, in exposure to air; passing the resulting mixture of manganese oxides to a slurry-preparation step; therein making an aqueous slurry containing from about 2 percent to 15 percent of the mixture of manganese oxides; passing the slurry down through a scrubbing tower; passing waste gases containing sulfur dioxide upward through the tower in intimate contact with descending slurry; withdrawing slurry containing a high proportion of dissolved manganese sulfate from a lower part of the tower; passing at least a substantial part of the withdrawn slurry to a precipitation step; therein precipitating manganese sulfate; separating precipitated manganese sulfate and residual manganese oxides from mother liquor; and recycling the manganese sulfate and residual manganese oxides to the calcining zone.

Thus, our process is essentially a cyclic method in which sulfur dioxide reacts with a regenerated mixture of manganese oxides to form manganese sulfate. The manganese sulfate is then precipitated and is heated to decomposition. Sulfur dioxide is evolved in admixture with a small quantity of sulfur trioxide and may be passed directly to a contact sulfuric acid plant or be used in any other desired manner.

Chemical reactions involved in the scrubbing step are:

(a) $MnO_2 + SO_2 \rightarrow MnSO_4$
(b) $MnO + H_2SO_4 \rightarrow MnSO_4 + H_2O$
(c) $Mn_3O_4 + 2H_2SO_4 \rightarrow 2MnSO_4 + MnO_2 + 2H_2O$
(d) $Mn_2O_3 + H_2SO_4 \rightarrow MnSO_4 + MnO_2 + H_2O$ Sulfuric acid, formed by oxidation of sulfur dioxide by residual oxygen in the waste gases or other side reactions, is recovered by reaction with lower oxides of manganese. Both sulfur dioxide and sulfur trioxide are converted to manganese sulfate and are evolved from the calcining zone as sulfur dioxide. Reactions of the lower oxides of manganese maintain substantial neutrality in the scrubbing step and thus minimize corrosion, increase the manganese sulfate content of the slurry, and prevent contamination of the slurry by dissolved iron.

We have found that a regenerated mixture of manganese oxides is superior to other manganese compounds, such as pyrolusite ore or manganese dioxide, in recovery of sulfur dioxide. Recovery is more complete and sulfuric acid is not a hindrance in our process.

Heating manganese sulfate to about 900° C. to 1100° C. in the calcining zone evolves sulfur dioxide according to the equation $$MnSO_4 \xrightarrow{heat} MnO_2 + SO_2$$

Since manganese dioxide is rather unstable at temperatures above 530° C., there is some decomposition of this oxide with formation of lower oxides. The lower oxides are formed in excess of the proportions required in the scrubbing step. However, the excess is easily removed by cooling the hot mixture of oxides with exposure to air. Oxygen from the air is absorbed, and a mixture containing the desired proportion of lower oxides is regenerated.

The cooling oxides may be exposed to a stream of air passing through a drum in which the oxides are tumbled, or in any other manner that permits control of the degree of exposure. Acidity in the scrubbing step may be controlled easily by varying the amount of exposure of the cooling oxides to air. Thus, it will be seen from Equations b, c, and d above that an insufficient proportion of lower oxides present in the slurry in the scrubbing step will result in the presence of sulfuric acid in the tower effluent. When this occurs, the amount of exposure of cooling oxides to air is reduced, as for example, by decreasing the rate of tumbling the mixture of oxides in a drum or by decreasing the rate of flow of air through the drum. The proportion of lower oxides is increased, and these oxides neutralize the sulfuric acid with formation of manganese sulfate. Steady-state operation may be obtained easily in this manner.

The attached drawing is a flow sheet illustrating diagrammatically one process utilizing principles of our invention. This process is described as applied to recovery of sulfur dioxide from waste gases generated in burning sulfur-bearing coal, but it is to be understood that the process is equally applicable to other sulfur dioxide containing waste gases such as gases from smelters, tail gases from sulfuric acid plants, and others, and that the gases treated may contain much more sulfur dioxide than the amounts described.

In the drawing the reference numeral 1 indicates a manganese sulfate calcination step. In this step, manganese sulfate in admixture with residual manganese oxides is heated in any suitable manner to a temperature in the range from about 900° C. to 1100° C. until rapid evolution of sulfur dioxide ceases. A stream of sulfur dioxide, the product of the process, is withdrawn via line 2 and may be passed to a contact sulfuric acid plant, not shown, or to any other use desired. The resulting mixture of manganese oxides, containing an excess of lower oxides, is withdrawn from calcination zone 1 and is passed by line 3 to an air-exposure step 4.

In step 4 the mixture of manganese oxides is cooled in exposure to air, and oxygen is absorbed in quantity sufficient to convert a part of the lower oxides of manganese to higher oxides. The equipment used in this step may be a rotary drum equipped with lifting flights, means for passing air through a bed of manganese oxides, or any other device for obtaining gas-solid contact. The equipment should provide for varying the degree of exposure of the cooling oxides to air, since it is not desirable to convert all manganese to manganese dioxide. About 10 to 15 percent of the manganese should be left in the form of lower oxides to perform their functions in a later scrubbing step.

The resulting cooled mixture of manganese oxides is passed, as indicated by line 6, to a slurry-preparation step 7. In step 7 sufficient oxides are agitated with recycled slurry, makeup water introduced by line 12, and makeup manganese introduced as manganese oxides, pyrolusite, or other manganese ore at 11 to give a slurry containing from about 2 to 15 percent manganese oxides. The resulting slurry is passed by line 8 to a scrubbing tower 9, and down through the tower. Tower 9 preferably is a cascade scrubber as illustrated, but any device capable of intimately contacting a slurry with a gas may be substituted for tower 9 if desired.

Waste gases containing sulfur dioxide evolved from any source, not shown, is introduced into a lower part of tower 9 by line 13 and is passed upward in intimate contact with descending slurry. These gases may be from the combustion of bituminous coal and high in phenolic compounds, since neither fly ash, carbon oxides, nor phenols interfere in the reaction occurring in the tower. Sulfur trioxide also may be present in considerable proportion and is converted to manganese sulfate by reaction with lower oxides of manganese according to the equations given above. Temperatures in the tower may be varied over a wide range. However, we prefer to operate at temperatures well below the boiling point of the slurry, because the solubility of the manganese sulfate produced in the tower varies inversely with the temperature, and precipitation in the tower may increase the solids content of the slurry enough to cause handling difficulties in later steps in the cycle.

Since operation of the tower at a temperature below the dew point of the waste gases would cause needless dilution of the slurry, we prefer to operate at temperatures above the dew point. Temperatures in the range from about 55° C. to 80° C. usually are preferred to avoid both the dew point of incoming gases and decreased solubility of manganese sulfate. We prefer to control rates of flow to achieve a concentration of dissolved manganese sulfate in the slurry a little below the saturation point. At 80° C. the solubility of manganese sulfate is about 31 percent, at 55° C. it is about 37 percent. When operating in the range from about 55° C. to 80° C., we prefer to obtain a dissolved manganese sulfate concentration in the slurry from about 30 percent at 80° C. to about 36 percent at 55° C.

The time of contact of liquid and slurry in tower 9 is maintained in the range from about 4 to 14 seconds. The contact time is chosen according to the completeness of recovery desired. At 4 seconds' contact time, recovery of sulfur dioxide from coal combustion gases containing 0.3 percent sulfur dioxides or less is about 80 percent complete. Recovery is substantially complete at 7 to 8 seconds' contact time, but other gases may require 2 to 6 seconds more for complete recovery. Waste gases from which sulfur dioxide has been removed are vented to the atmosphere by line 14.

An effluent slurry, high in dissolved manganese sulfate, is withdrawn from tower 9 by line 16, containing valves 17 and 18. We prefer to divide the effluent into at least two streams, recycling one stream to the slurry-preparation step 7 by line 27. By recycling a part of the slurry, we raise the dissolved manganese sulfate content of the effluent slurry at the bottom of tower 9 almost to the saturation point. For example, the solubility of manganese sulfate at 80° C. is about 31 percent. When operating at this temperature, we prefer to recycle sufficient effluent slurry to bring the concentration at the bottom of the tower to about 30 percent manganese sulfate. This cannot be accomplished in a single pass of liquid through the tower unless the tower is very large, since there must be sufficient flow of liquid on the cascade plates to keep undissolved manganese oxides and any other solids present, such as fly ash, from settling out of the slurry.

At least a substantial part of the effluent is passed by line 19, containing valve 21, to a manganese sulfate precipitation step 22. Precipitation preferably is accomplished by heating the effluent. If the tower is operated in our preferred range of about 55° C. to 80° C., heating the slurry to boiling is sufficient to precipitate a large proportion of its dissolved manganese sulfate content. The sensible heat of incoming waste gases may be utilized to furnish the heat required. If the tower is operated at a temperature above 80° C, it may be necessary to heat the slurry under pressure to 160° C. or so in order to get good precipitation. In any case, heating under pressure will result in much more complete precipitation of manganese sulfate and the use of pressure equipment or simple boiling will be dictated by the economics of the particular installation.

The slurry containing precipitated manganese sulfate, unreacted manganese oxides, and any other solids which may be present is passed to a solids-separation step 24 by line 23. Here solids are separated from mother liquor by filtration, centrifuging, or any other means for separation it may be desired to use. Mother liquor is passed by line 26 to recycle line 27 and back to slurry-preparation step 7. The solids containing manganese sulfate are passed by line 28 to manganese sulfate calcination step 1, and the cycle is repeated.

Coal gases may contain sufficient fly ash to cause a troublesome buildup of insoluble matter in the slurry after long periods of operation. When the waste gases being treated contain sufficient solids to necessitate their removal, a third stream is withdrawn from the tower effluent in line 16 by valved line 29 to a solids-settling step 30, and the solids are settled by gravity. Supernatant liquid is withdrawn from this step and is returned to the system, preferably by lines 31 and 19, to manganese sulfate precipitation step 22. The settled solids are passed by line 32 to a manganese-recovery step 33, where they are extracted with dilute sulfuric acid introduced by line 34 and sulfur dioxide introduced by line 35. The liquid extract from this step is passed by line 36 to recycle line 27 and back to the slurry-preparation step 7. Solid residue is withdrawn and discarded as shown by line 38.

*Example I*

A mixture of manganese oxides was prepared by calcining manganese sulfate. Tests were made, using a cascade scrubbing tower, to compare the efficiency of the mixture of oxides in absorbing sulfur dioxide from gaseous mixtures with that of other manganese compounds. The mixture of oxides was found to be much more efficient. Under substantially identical conditions pyrolusite absorbed only 60 percent of sulfur dioxide from a stream of gases, and an equivalent quantity of the mixture of oxides absorbed 90 percent. Manganese dioxide also was found to be inferior to the mixture of oxides. When pyrosulite or manganese dioxide was used, a large proportion—up to 26 percent—of the sulfur was converted to sulfuric acid, which corroded the equipment. With the mixture of oxides, only slight acidity developed in the scrubbing tower.

*Example II*

Several batches of regenerated manganese oxides were made by calcining manganese sulfate to 1000° C. to 1100° C. The products were cooled in exposure to dry air.

A water slurry containing about 10 percent of these oxides was prepared. A mixture of gases containing about 0.35 percent sulfur dioxide, 3.5 percent oxygen, 16 percent carbon dioxide, and 80 percent nitrogen was scrubbed with this slurry in a cascade scrubbing tower. Essentially all sulfur dioxide was removed from the gas until almost all the solid oxides had reacted. When absorption of sulfur dioxide began to decrease, more of the regenerated oxides was added to the slurry to bring its manganese oxide content to the range from about 2 percent to 15 percent and complete recovery of sulfur dioxide was reestablished. This process was continued for 224 operating hours. At the end of this period, the efficiency of sulfur dioxide recovery had not decreased noticeably.

Some unreacted lower oxides of manganese accumulated in the system. In other tests, it was shown that this accumulation of lower oxides could be avoided by varying the degree of exposure to air and consequent reoxidation during cooling in the regeneration procedure. The absorption tower was operated at about 70° C. The effluent from the bottom of the tower contained about 31 percent manganese sulfate.

*Example III*

Uncleaned flue gas from a coal burner was scrubbed in a cascade scrubbing tower with a slurry of regenerated manganese oxides prepared by calcining manganese sulfate at about 1000° to 1100° C. The slurry contained about 10 percent of solid oxides at the beginning. Periodic additions of regenerated oxides to a recycled stream of slurry were made to keep the content of solid oxides near 10 percent, and the run was continued for 72 hours.

Typical composition of the flue gas in volume percent was: sulfur dioxide, 0.26; oxygen, 2.4; carbon dioxide, 15.6; and nitrogen, 81.7. A temperature of about 60° C. was maintained in the tower. With a retention time of 4 seconds, about 80 percent of the sulfur dioxide in the flue gas was absorbed. With retention times of 7.5 seconds or more, essentially all sulfur dioxide was absorbed. During the entire time of the test, under a given set of conditions, absorption efficiency for sulfur dioxide remained substantially constant. Only a trace of sulfuric acid was present. A tower effluent containing about 29 percent manganese sulfate was withdrawn.

During this 72-hour test a considerable quantity of fly ash accumulated in the slurry. A solid residue was separated from the slurry and was found to contain iron equivalent to 7.7 percent $Fe_2O_3$, but no iron was found in the scrubber solution.

We claim as our invention:

1. In the process of recovering sulfur dioxide from waste gases in which the waste gases containing sulfur dioxide are passed in a scrubbing step upwardly through a scrubbing tower in intimate contact with a descending aqueous slurry of manganese oxides, which aqueous slurry is withdrawn from the lower part of the tower to a precipitation step from which precipitated manganese sulfate is sent to a calcining step wherein the sulfur dioxide product is separated and the regenerated manganese oxides are recovered for recycling to an aqueous slurry-preparation step, the improvement in combination therewith which comprises controlling the proportion of lower manganese oxides formed from the calcination step by subsequently cooling the hot mixture of manganese oxides formed therein with exposure to air to a degree to maintain low slurry acidity in said scrubbing step, whereby the regenerated manganese oxides are superior to other manganese compounds, such as pyrolusite ore or manganese dioxide, in the recovery of sulfur dioxide from waste gases.

2. In the process of recovering sulfur dioxide from waste gases in which the waste gases containing sulfur dioxide are passed in a scrubbing step upwardly through a scrubbing tower in intimate contact with a descending aqueous slurry of manganese oxides a substantial portion of which aqueous slurry is withdrawn from a lower part of the tower to a precipitation step from which precipitated manganese sulfate is sent to a calcining step wherein the sulfur dioxide product is separated and the regenerated manganese oxides are recovered for recycling to an aqueous slurry-preparation step along with the remaining portion of slurry, the improvement in combination therewith which comprises controlling the proportion of lower manganese oxides formed from the calcining step by subsequently cooling the hot mixture of manganese oxides formed therein with exposure to air to a degree to maintain low slurry acidity in said scrubbing step, whereby the regenerated manganese oxides are superior to other manganese compounds, such as pyrolusite ore or manganese dioxide, in the recovery of sulfur dioxide from waste gases.

3. In the process of recovering sulfur dioxide from waste gases in which the waste gases containing sulfur dioxide are passed in a scrubbing step upwardly through a scrubbing tower in intimate contact with a descending aqueous slurry of manganese oxides containing about 30 percent to 36 percent of dissolved manganese sulfate a substantial portion of which aqueous slurry is withdrawn from the lower part of the tower to a precipitation step from which precipitated manganese sulfate is sent to a calcining step wherein the sulfur dioxide product is separated and the regenerated manganese oxides are recovered for recycling to an aqueous slurry-preparation step along with the remaining portion of slurry, the improvement in combination therewith which comprises controlling the proportion of lower manganese oxides formed from the calcining step by subsequently cooling the hot mixture of manganese oxides formed therein with exposure to air to a degree to maintain low slurry acidity in said scrubbing step, whereby the regenerated manganese oxides are superior to other manganese compounds, such as pyrolusite ore or manganese dioxide, in the recovery of sulfur dioxide from waste gases.

4. In the process of recovering sulfur dioxide from waste gases in which the waste gases containing sulfur dioxide are passed in a scrubbing step upwardly through a scrubbing tower in intimate contact with a descending aqueous slurry containing about 2 percent to 15 percent of a mixture of manganese oxides formed in a later air-exposure step, said aqueous slurry also containing about 30 percent to 36 percent of dissolved manganese sulfate, a substantial portion of which aqueous slurry is withdrawn from a lower part of the tower to a precipitation step from which precipitated manganese sulfate is sent to a calcining step, wherein the sulfur dioxide product is separated and the regenerated manganese oxides are recovered for recycling to an aqueous slurry-preparation step along with the remaining portion of slurry, the improvement in combination therewith which comprises controlling the proportion of lower manganese oxides formed from the calcining step by subsequently cooling the hot mixture of manganese oxides formed therein with exposure to air to a degree to maintain low acidity in said scrubbing step, whereby the regenerated manganese oxides are superior to other manganese compounds such as pyrolusite ore or manganese dioxide in the recovery of sulfur dioxide from waste gases.

References Cited in the file of this patent

UNITED STATES PATENTS 2,691,570     Allen  ---------------- Oct. 12, 1954